(12) United States Patent
van Tienen et al.

(10) Patent No.: US 10,644,989 B2
(45) Date of Patent: May 5, 2020

(54) METHOD FOR RUNNING A COMPUTER NETWORK

(71) Applicant: Robert Bosch GmbH, Stuttgart (DE)

(72) Inventors: Stephan van Tienen, Bergen op Zoom (NL); Tom De Brouwer, Breda (NL); Marcel Versteeg, Papendrecht (NL); Marc Smaak, Bergen op Zoom (NL)

(73) Assignee: Robert Bosch GmbH, Stuttgart (DE)

( * ) Notice: Subject to any disclaimer, the term of this patent is extended or adjusted under 35 U.S.C. 154(b) by 256 days.

(21) Appl. No.: 14/428,033

(22) PCT Filed: Sep. 19, 2012

(86) PCT No.: PCT/EP2012/068416
§ 371 (c)(1),
(2) Date: Mar. 13, 2015

(87) PCT Pub. No.: WO2014/044303
PCT Pub. Date: Mar. 27, 2014

(65) Prior Publication Data
US 2015/0271057 A1    Sep. 24, 2015

(51) Int. Cl.
*H04L 12/705* (2013.01)
*H04L 12/753* (2013.01)
*H04L 12/46* (2006.01)
*H04L 12/755* (2013.01)

(52) U.S. Cl.
CPC ............ *H04L 45/18* (2013.01); *H04L 12/462* (2013.01); *H04L 45/021* (2013.01); *H04L 45/48* (2013.01)

(58) Field of Classification Search
CPC ..... H04L 45/18; H04L 12/462; H04L 45/021; H04L 45/48

USPC .......................................................... 709/223
See application file for complete search history.

(56) References Cited

U.S. PATENT DOCUMENTS

| | | | |
|---|---|---|---|
| 5,146,598 A * | 9/1992 | Takezawa | H04N 1/00915 710/260 |
| 8,356,296 B1 * | 1/2013 | Welder | G06F 15/177 717/176 |
| 2002/0087697 A1 * | 7/2002 | Kashyap | H04L 69/16 709/227 |

(Continued)

FOREIGN PATENT DOCUMENTS

| | | |
|---|---|---|
| CN | 1750541 | 3/2006 |
| CN | 1798155 | 7/2006 |

(Continued)

OTHER PUBLICATIONS

International Search Report for Application No. PCT/EP2012/068416 dated Nov. 19, 2012 (2 pages).

(Continued)

*Primary Examiner* — Arvin Eskandarnia
(74) *Attorney, Agent, or Firm* — Michael Best & Friedrich LLP

(57) ABSTRACT

The invention provides for a method for running a computer network and such a computer network. The computer network comprises a number of devices being arranged in a stable daisy-chained loop, wherein each device comprises a bridge having at least three ports, whereby during running the computer network each device can take different states to avoid a loop, and whereby in case of rebooting the ports of at least one of the devices keep their current port states.

18 Claims, 2 Drawing Sheets

(56) References Cited

U.S. PATENT DOCUMENTS

| | | | |
|---|---|---|---|
| 2004/0179524 A1* | 9/2004 | Sasagawa | H04L 45/04 370/389 |
| 2005/0198232 A1* | 9/2005 | Haalen | H04L 41/082 709/221 |
| 2006/0059269 A1* | 3/2006 | Chen | H04L 49/254 709/235 |
| 2006/0095592 A1* | 5/2006 | Borkenhagen | G06F 13/1673 710/2 |
| 2006/0250947 A1* | 11/2006 | Allen | H04L 12/40182 370/216 |
| 2007/0159988 A1* | 7/2007 | Khan | H04L 12/4625 370/256 |
| 2009/0292858 A1* | 11/2009 | Lambeth | H04L 29/12839 711/6 |
| 2010/0110880 A1* | 5/2010 | Kulkarni | H04L 12/462 370/221 |
| 2012/0047405 A1* | 2/2012 | Smaak | H04L 12/1868 714/48 |
| 2012/0182901 A1* | 7/2012 | Musku | H04L 45/028 370/254 |
| 2013/0089202 A1* | 4/2013 | Altmann | H04N 21/4122 380/211 |
| 2014/0254604 A1* | 9/2014 | Janardhanan | H04L 45/18 370/401 |
| 2014/0351893 A1* | 11/2014 | Corddry | H04L 67/22 726/3 |

FOREIGN PATENT DOCUMENTS

| | | |
|---|---|---|
| CN | 101523805 | 9/2009 |
| EP | 1720293 | 11/2006 |
| JP | 11017724 | 1/1999 |
| WO | 2010088965 | 8/2010 |
| WO | 2011/123002 | 10/2011 |

OTHER PUBLICATIONS

Janiszewski et al., "Recovery Time of Redundant Ethernet-Based Networked Audio Systems," AES Convention 128, May 2010, AES, 60 East 42nd Street, Room 2520 New York 10165-2520, USA, May 1, 2010.

* cited by examiner

METHOD FOR RUNNING A COMPUTER NETWORK

BACKGROUND OF THE INVENTION

The invention provides for a method for running a computer network, especially a method for developing stable daisy-chained Ethernet loops and an arrangement for providing such loops. Furthermore, the invention provides for such a computer network.

A computer network is a collection of computers and other components interconnected by communication channels. These channels allow for sharing of resources and information. Computer networks can be classified according to a variety of characteristics as the medium used, communication protocols, scale, topology, and organizational scope.

Document WO 2010/088965 A1 shows a method for using a computer network comprising a number of bridges each having ports for receiving and sending streams. The streams are sent from a router via the ports of bridges that have shown interest to at least one receiver, whereby in case of a link failure at least one receiver sends back a message to the router. The method can be used in a so called Ethernet network.

Ethernet networks are frame-based computer networks for local area networks. It is to be noted that Ethernet networks cannot handle loops. If a loop is created, packets will continuously be communicated over the loop. Standard protocols are developed to detect loops and isolate both ends of the loops. When the network topology changes, detection is restarted to avoid creation of unconnected parts of the network or new loops.

Loops are usually created for cable and equipment redundancy using Ethernet bridges. Devices are usually star-wired to the bridges.

It can take some time before loops are detected. To avoid overload of the network by circling packets, the default in loop detection protocol is that there is no link. This means that there is no communication until the network topology is correctly detected. The best known protocols are Spanning Tree Protocol and Rapid Spanning Tree Protocol.

The Spanning Tree Protocol (STP) is a network protocol that ensures a loop-free topology for bridged Ethernet networks. STP is adapted to prevent bridge loops and broadcast radiation. For this, it creates a spanning tree within a mesh network of connected-2-bridge layers, e.g. Ethernet bridges, and disables those links that are not part of the spanning tree, leaving a single active path between any two network nodes.

The Rapid Spanning Tree Protocol (RSTP) provides for significantly faster spanning tree convergence after a topology change introducing new convergence behaviour and bridge port rules.

STP takes more than 30 seconds to recreate the network topology, RSTP takes 2 seconds or less in case of physical link failure.

Audio networks can require a daisy-chained solution for its end devices. This is solved in a standard way by adding an Ethernet bridge with at least three ports to each device. Typically, in audio network the number of devices being daisy-chained is specified large, e.g. 20. Redundancy is an important feature for audio networks. Therefore, it must be possible to create a loop with a chain of 20 devices. Each device in the audio network is an end device, e.g. a loudspeaker.

Daisy chain is a wiring scheme in which multiple devices are wired together in sequence or in a ring. Each of the network devices includes an upstream port and a downstream port, whereby each port is coupled to a cable. A third port in each device is adapted to receive traffic from and transmit traffic to the network.

Document EP 1 720 293 A1 shows a method for providing redundancy in a daisy chain local area network. The method comprises the steps of forming in each network device a passive signal path, connecting pins of an upstream port associated with the normally used twisted pairs of a Cat 5 cable to pins of a downstream port associated with the normally unused twisted pairs of the Cat 5 cable, forming loop back connections at the terminal network devices, and implementing a Spanning Tree Protocol in each of the network devices for defining an active signal path through the local area network.

SUMMARY OF THE INVENTION

According to the invention, a method is for running a computer network, especially an Ethernet network, comprising a number of devices being arranged in a stable daisy-chained loop. Each device comprises a bridge having at least three ports. The third port is adapted to receive traffic from and transmit traffic to the computer network.

The ports of each device can take different port states during running the computer network, e.g. forwarding and discarding state. It is to be noted that during rebooting the device will not run RSTP for some time. During this period it will keep the port states it had before the reboot. It is assumed that the device was in the correct state before rebooting. The bridge of the device is kept in this state until RSTP state machines are running again. This means that the bridge is neither reset nor reinitialized during rebooting. Therefore, the communication path is not interrupted during rebooting.

For communication between bridges, the so-called Bridge protocol is used. Packets of the protocol are Bridge Protocol Data Units (BPDU). To ensure that each bridge has enough information, BPDUs are used. A bridge sends a BPDU frame using the unique MAC address of the port itself as a source address.

RSTP port states are:

Discarding: No user data is sent and any received data other than a BPDU is discarded. Received BPDUs are processed.

Learning: Port learns source addresses of any incoming data.

Forwarding: Port receives and sends data.

Disabled: Can be done by network administrator.

Figure 1:
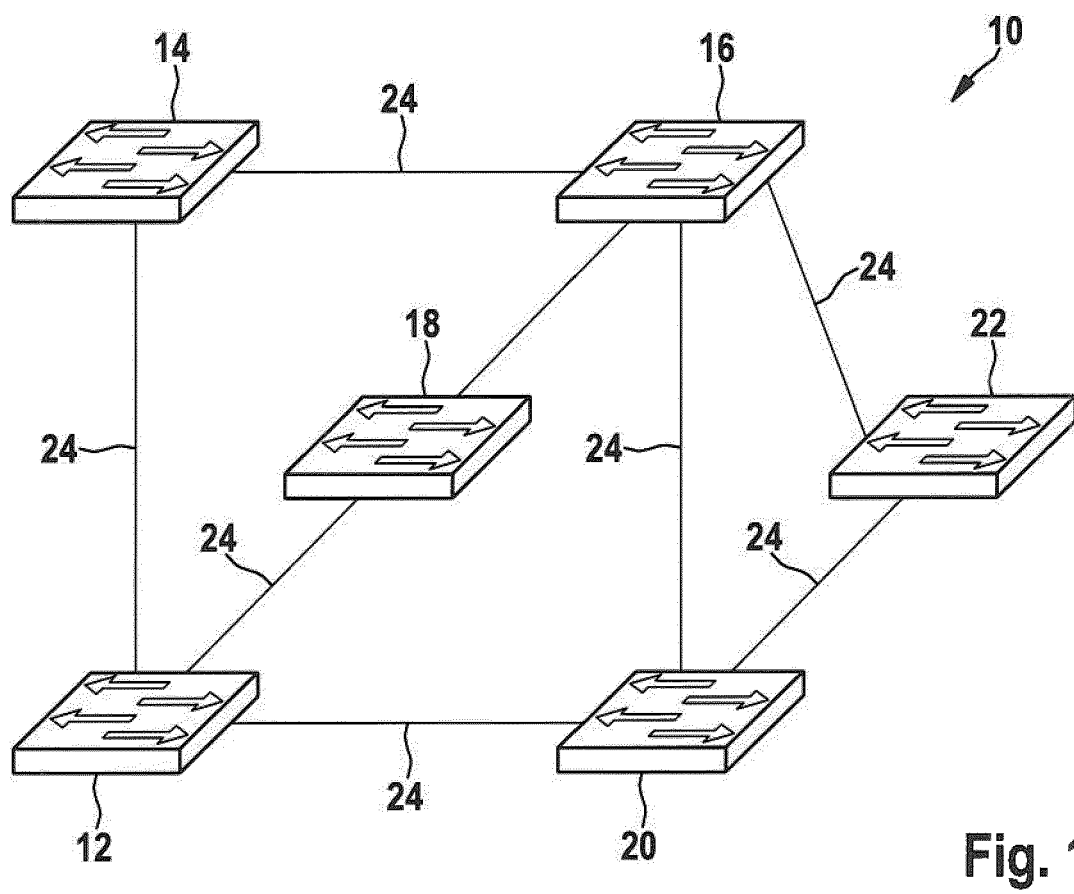
FIG. 1 is an Ethernet network comprising a number of bridges with redundant loops.

It will be understood that the features mentioned above and those described hereinafter can be used not only in the combination specified but also in other combinations or on their own, without departing from the scope of the invention.

The invention is diagrammatically illustrated in the drawings by means of embodiments by way of example, and is hereinafter explained in detail with reference to the drawings. It is understood that the description is in no way limiting on the scope of the present invention and is nearly an illustration of embodiments of the invention.

DETAILED DESCRIPTION

FIG. 1 shows an Ethernet network 10 comprising a number of bridges with redundant loops. The Ethernet network 10 comprises a bridge A 12, a bridge B 14, a bridge C 16, a bridge D 18, a bridge E 20, and a bridge F 22 being connected by communication channels 24. The network 10 shown also comprises a number of loops.

It can take some time before loops are detected. To avoid overload of the network by circling packets the default in loop detection protocols is that there is no link. This means there is no communication until the network topology is correctly detected. The most known protocols are Spanning Tree Protocol and Rapid Spanning Tree Protocol. STP takes more than 30 seconds to recreate the network topology where RSTP can do this in less than 2 seconds.

Figure 2:
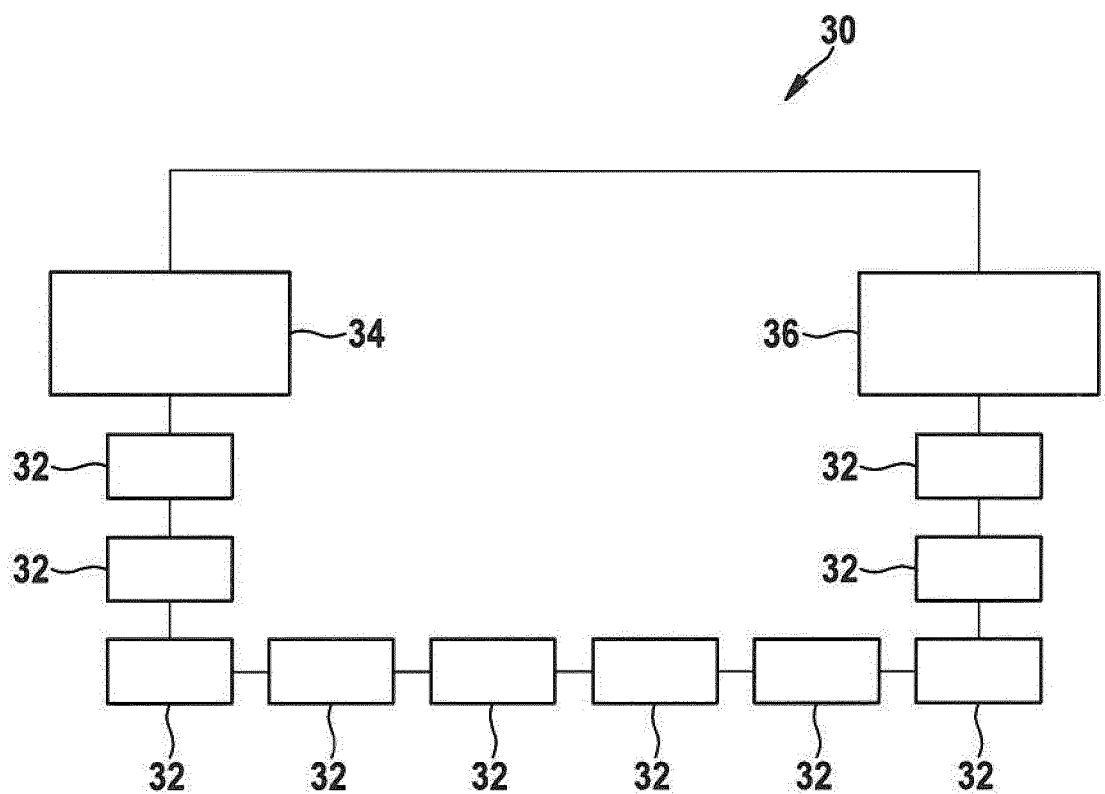
FIG. 2 is a number of audio network devices being arranged in a stable daisy-chained loop.

FIG. 2 shows a computer network 30, in this case an audio network, comprising a number of devices 32 being arranged in a daisy-chained loop between a first Ethernet bridge 34 and a second Ethernet switch 36 supporting RSTP. Each device 32 comprises a bridge having three ports.

The bridges within the devices 32 do not have to support RSTP. However, if the devices do not support RSTP it will take dozens of seconds before the network is fully configured. If a cable between any of the devices 32 is interrupted it will again take typically 3×hello time before the network is reconfigured. Audio is very sensitive to communication loss since there is not retry mechanism in place. This means the loss of audio is equal to the network reconfiguration time.

Bridges 34 and 36 can be root bridges. The bridges 32 in the devices 32 can not. When a root bridge would fail it can take up to 6 seconds before a new root bridge is elected. Therefore, the bridges within the device 32 should not become a root bridge. The root bridge is always the bridge having the lowest priority. The priority of bridges is explicitly set higher than default to prevent it to become a root bridge.

By running an RSTP algorithm in each device 32, the network reconfiguration time can be reduced to less than a second. This solves most of the problems but sometimes the device reboots or switches to firmware update mode. In these situations, it will take about 16 seconds before the RSTP algorithm is settled again.

In the course of this, the network topology is usually not changed and therefore, the state before the reboot is still valid. This avoids a topology change and therefore, no interruption of audio and data.

To avoid loops the device always starts with the Ethernet ports blocked. Only after communication of the RSTP messages, ports can be placed in the forwarding state. When the device reboots without a power loss, the port state assumably is still correct. Therefore, the state is kept persistently until the RSTP algorithm is full up and running again. The rebooting device will not send BPDUs until the RSTP algorithm is up and running. To avoid that the other devices will detect a topology change during this, the default BPDU hello time is increased from the default 2 seconds to x seconds, e.g. 10 seconds.

If the time it takes to have RSTP up and running is y and the hello time is x, the following contraint must hold: $y \leq 2x$ if the device is not forced to send a hello BPDU before being reset, and $y \leq 3x$ if the device is forced to send a hello BPDU before being reset. As it takes about 16 seconds for the device to have RSTP up and running a hello time of 9 seconds is currently used.

The devices 32 can inform each other of their existence every z seconds, wherein z corresponds to ½ of their boot time. Furthermore, each device 32 can have a mechanism to make sure to react on any converge to avoid loops.

Figure 3:
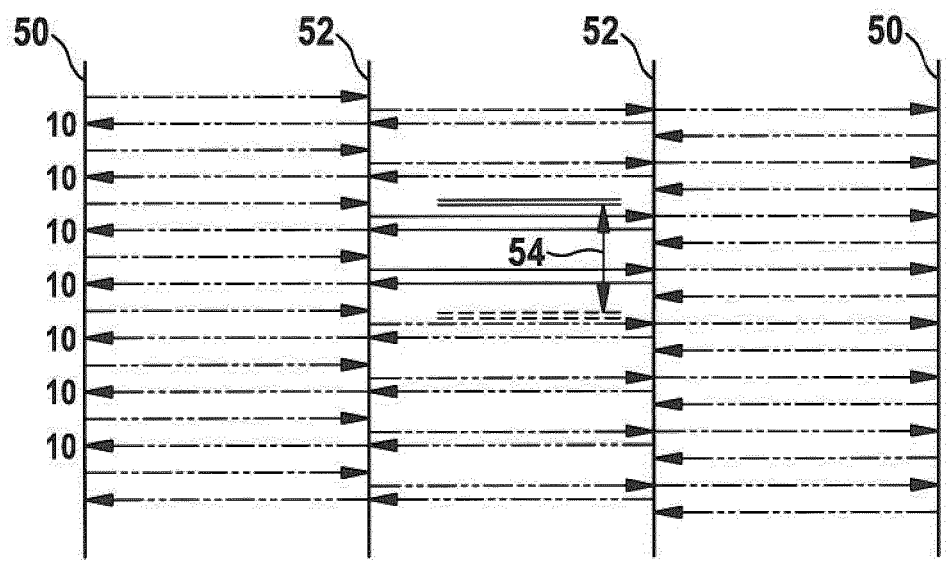
FIG. 3 is a diagram depicting BPDUs showing hello time timeout.

FIG. 3 shows a diagram for illustrating communication within an Ethernet network. Reference number 50 represents RSTP supporting Ethernet bridges, reference number 52 represents devices supporting the method according to the invention. Thin dash/dotted lines showing the BPDU's exchange. Between the thick double line and double dotted line the device reboots. The solid lines indicate the BPDUs which are not sent out due to the reboot of the devices. The indication 10 on the left side represents 10 seconds. The double arrow 54 represents 15 seconds.

The hello time is the time interval between the BPDU's sent from a bridge. It is used to inform the other bridge "hello I am here". If you miss 3 BPDUs, this is 30 seconds with 10 seconds hello time, the other bridge will switch to the discarding mode again. The hello time is only used after the network has converged. Ports in forwarding state will then sent a BPDU every hello time seconds, ports in discarding state will expect an incoming BPDU every hello time seconds. It is meant to indicate the network is still converged.

According to the RSTP specification, a device will issue a topology change when it misses 3 BPDUs. In a worst case scenario, the rebooting device was about to send a BPDU when it reboots. This means that RSTP must be up and running within 2×hello time seconds after reboot. Alternatively, the device could send out a BPDU first before it reboots since this reboot is normally planned. This increases the reboot time to 3×hello time seconds.

After boot-up of a device the state machines of RSTP are started. Firstly, the state machines will put all ports in discarding state and after this to learning state. If the neighbour devices of the booting device were not reset they will react fast to the BPDU's sent by the booting device. The ports of the booting device will then move to forwarding state quickly.

However, if the neighbour devices are also booting as they are reset too, it may take longer before they respond. This may still cause an interruption of the chain as the ports stay in learning state for a longer period and regular traffic is still not forwarded in learning state. In order to solve this, the ports that were in forwarding state are kept in that state, even if the RSTP algorithm indicates that they should go to discarding or learning state. The only exception to this rule is when a topology change BPDU is received on a port which means that the neighbour device has started a new network convergence. In that case the actual RSTP port state is forced onto the port before the acknowledgement of the topology change is sent back. Therefore, loops are prevented.

In the case that there is a topology change when a device reboots the root bridge will still be able to break the loop. However, this will result in communication loss of dozens of seconds. It is important that the (root) Ethernet bridge is also configured to this x seconds hello time.

The invention claimed is:

1. A method for running a computer network comprising a first Ethernet bridge, a second Ethernet bridge, and a number of devices being arranged in a stable daisy-chained loop between the first Ethernet bridge and the second Ethernet bridge, wherein each device comprises a bridge having at least three ports, whereby during running the computer network each device can take different states to avoid a loop, and whereby in case of rebooting the ports of at least one of the devices keep their current port states without interrupting the communication path during rebooting, wherein only the first Ethernet bridge and the second Ethernet bridge are configured to be a root bridge.

2. The method according to claim 1, wherein the device is in forwarding state.

3. The method according to claim 1, wherein the device is in discarding state.

4. The method according to claim 1, wherein the device immediately updates the port states after reception of a network topology change message.

5. The method according to claim 1, wherein the devices inform each other of their existence about every z seconds, wherein z corresponds to ½ of their boot time.

6. The method according to claim 1, wherein the devices are configured to have the hello time set to x seconds, where x is calculated from the maximum time y it takes to have RSTP up and running after a soft reboot, whereby x>y/2.

7. The method according to claim 1, wherein the devices are configured to have the hello time set to x seconds, where x is calculated from the maximum time y it takes to have RSTP up and running after a soft reboot, whereby x>y/3.

8. A computer network comprising a first Ethernet bridge, a second Ethernet bridge, and a number of devices being arranged in a stable daisy-chained loop between the first Ethernet bridge and the second Ethernet bridge, each device comprising a bridge having at least three ports, wherein the computer network is configured to
change states to avoid a loop, and
in case of rebooting the ports of at least one of the devices, maintain their current port states without interrupting the communication path during rebooting, wherein only the first Ethernet bridge and the second Ethernet bridge are configured to be a root bridge.

9. The computer network according to claim 8, wherein the computer network is an Ethernet network.

10. The computer network according to claim 8, wherein the devices are end devices of an audio network.

11. The computer network according to claim 8, wherein each device has a mechanism to make sure to react on any converge to avoid loops.

12. The computer network according to claim 9, wherein the devices are end devices of an audio network.

13. The computer network according to claim 8, wherein the at least one of the devices having the rebooting ports proceeds to send BPDUs in response to a RSTP algorithm is up and running.

14. The computer network according to claim 8, wherein a hello time is increased in response to the ports rebooting to avoid detection of a topology change of the network.

15. The computer network according to claim 14, wherein the hello time is longer when the device having the rebooting ports transmits a BPDU before rebooting than when the device having the rebooting ports fails to transmit a BPDU before rebooting.

16. The method according to claim 1, wherein the at least one of the devices having the rebooting ports proceeds to send BPDUs in response to a RSTP algorithm is up and running.

17. The method according to claim 1, wherein a hello time is increased in response to the ports rebooting to avoid detection of a topology change of the network.

18. The method of claim 17, wherein the hello time is longer when the device having the rebooting ports transmits a BPDU before rebooting than when the device having the rebooting ports fails to transmit a BPDU before rebooting.

* * * * *